(12) United States Patent
Morton

(10) Patent No.: US 10,563,589 B2
(45) Date of Patent: Feb. 18, 2020

(54) ENGINE OVERSPEED PROTECTION WITH THRUST CONTROL

(71) Applicant: GENERAL ELECTRIC COMPANY, Schenectady, NY (US)

(72) Inventor: Scott Chandler Morton, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 550 days.

(21) Appl. No.: 14/784,361

(22) PCT Filed: Apr. 9, 2014

(86) PCT No.: PCT/US2014/033520
§ 371 (c)(1),
(2) Date: Oct. 14, 2015

(87) PCT Pub. No.: WO2015/023323
PCT Pub. Date: Feb. 19, 2015

(65) Prior Publication Data
US 2016/0053689 A1    Feb. 25, 2016

Related U.S. Application Data

(60) Provisional application No. 61/811,753, filed on Apr. 14, 2013.

(51) Int. Cl.
*F02C 7/236* (2006.01)
*F02C 9/32* (2006.01)
(Continued)

(52) U.S. Cl.
CPC ............. *F02C 7/236* (2013.01); *F02C 3/04* (2013.01); *F02C 7/232* (2013.01); *F02C 9/263* (2013.01);
(Continued)

(58) Field of Classification Search
CPC .... F02C 7/22; F02C 7/236; F02C 9/26; F02C 9/263; F02C 9/46; F02C 9/32;
(Continued)

(56) References Cited

U.S. PATENT DOCUMENTS 2,617,477 A * 11/1952 Isreeli ................... F02C 9/46
137/118.07
2,761,387 A * 9/1956 Gaubatz ................ F02C 7/236
417/286
(Continued)

FOREIGN PATENT DOCUMENTS

GB    1459404 A    12/1976
WO    9932772 A1    7/1999
(Continued)

OTHER PUBLICATIONS

International Search Report and Written Opinion dated Feb. 13, 2015 which was issued in connection with PCT Patent Application No. PCT/US2014/033520.

*Primary Examiner* — Gerald L Sung
*Assistant Examiner* — Alain Chau
(74) *Attorney, Agent, or Firm* — Dority & Manning, P.A.

(57) ABSTRACT

A fuel pump system having a servo controlled pump bypass is utilized. The servo controlled bypass around the fuel pump provides the capability for the fuel flow rate to be adjusted and controlled independent of the fuel metering system.

16 Claims, 3 Drawing Sheets

(51) Int. Cl.
*F02C 9/46* (2006.01)
*F02C 9/26* (2006.01)
*F02C 3/04* (2006.01)
*F02C 7/232* (2006.01)

(52) U.S. Cl.
CPC .............. *F02C 9/32* (2013.01); *F02C 9/46* (2013.01); *F05D 2220/32* (2013.01); *F05D 2260/606* (2013.01); *F05D 2270/021* (2013.01)

(58) Field of Classification Search
CPC .. F02C 9/232; F02C 9/28; F02C 9/236; F05D 2270/021; F05D 2260/606
See application file for complete search history.

(56) References Cited

U.S. PATENT DOCUMENTS

| | | | | |
|---|---|---|---|---|
| 2,780,172 A * | 2/1957 | Coar | F02C 7/236 | 417/286 |
| 3,011,308 A * | 12/1961 | Wotring | F02C 7/236 | 239/124 |
| 3,056,259 A * | 10/1962 | Jubb | F02C 7/224 | 417/202 |
| 3,173,468 A * | 3/1965 | McCombs, Jr. | F02C 7/22 | 137/51 |
| 3,332,234 A * | 7/1967 | Lavash | F02C 7/236 | 60/39.281 |
| 3,808,799 A * | 5/1974 | Taylor | F02C 9/263 | 60/39.281 |
| 3,808,800 A * | 5/1974 | Taylor | F02C 9/263 | 60/39.281 |
| 3,808,801 A * | 5/1974 | Taylor | F02C 9/263 | 60/39.281 |
| 4,033,112 A * | 7/1977 | Schuster | F02C 9/32 | 60/39.281 |
| 4,339,917 A * | 7/1982 | LaGrone | F02C 7/236 | 137/565.32 |
| 4,578,945 A | 4/1986 | Peck et al. | | |
| 4,608,820 A * | 9/1986 | White | F02C 9/46 | 251/129.11 |
| 4,716,723 A * | 1/1988 | Ralston | F01D 21/02 | 60/39.281 |
| 4,751,942 A * | 6/1988 | Dyer | F02C 9/263 | 137/599.08 |
| 4,760,662 A * | 8/1988 | Dyer | F02C 9/263 | 60/39.281 |
| 4,987,737 A * | 1/1991 | Cantwell | F01D 21/02 | 60/39.281 |
| 5,118,258 A * | 6/1992 | Martin | F02C 7/236 | 417/3 |
| 5,209,058 A * | 5/1993 | Sparks | F02C 7/22 | 60/39.281 |
| 5,927,064 A * | 7/1999 | Dyer | F01D 21/02 | 60/39.281 |
| 6,389,816 B1 | 5/2002 | McCarty et al. | | |
| 6,655,151 B2 * | 12/2003 | Mahoney | F02C 9/263 | 60/39.281 |
| 6,751,942 B2 * | 6/2004 | Mahoney | F02C 9/263 | 60/39.281 |
| 6,922,625 B2 * | 7/2005 | Weir | F02C 9/263 | 244/194 |
| 7,185,485 B2 * | 3/2007 | Lewis | F02C 9/263 | 60/243 |
| 7,836,676 B2 * | 11/2010 | Futa, Jr. | F02C 7/232 | 60/39.281 |
| 7,966,995 B2 * | 6/2011 | Futa, Jr. | F02C 7/232 | 123/511 |
| 8,291,886 B2 * | 10/2012 | Mahoney | F02C 9/30 | 123/399 |
| 8,857,150 B2 * | 10/2014 | Aurousseau | F02C 7/236 | 60/39.091 |
| 2003/0136103 A1* | 7/2003 | Reuter | F01D 25/20 | 60/39.08 |
| 2003/0192300 A1* | 10/2003 | Mahoney | F02C 9/263 | 60/39.281 |
| 2004/0117102 A1* | 6/2004 | Weir | F02C 9/263 | 701/100 |
| 2005/0284148 A1 | 12/2005 | Wernberg et al. | | |
| 2007/0044768 A1* | 3/2007 | Eick | F02C 7/22 | 123/478 |
| 2010/0064657 A1* | 3/2010 | Mahoney | F02C 7/236 | 60/39.281 |
| 2010/0089026 A1* | 4/2010 | Baker | F02C 7/236 | 60/39.281 |
| 2010/0242431 A1* | 9/2010 | Baker | F02C 7/232 | 60/39.281 |
| 2010/0263634 A1 | 10/2010 | Futa, Jr. et al. | | |
| 2011/0253231 A1 | 10/2011 | Dore et al. | | |
| 2013/0192679 A1* | 8/2013 | Ripley | F02C 7/236 | 137/2 |
| 2016/0053689 A1 | 2/2016 | Morton | | |

FOREIGN PATENT DOCUMENTS

WO 2003023208 A1 3/2003
WO WO2003023208 A1 3/2003

* cited by examiner

ENGINE OVERSPEED PROTECTION WITH THRUST CONTROL

CROSS REFERENCES TO RELATED APPLICATIONS

This is a national stage application under 35 U.S.C. § 371(c) of prior filed, co-pending PCT application serial number PCT/US2014/033520, filed on Apr. 9, 2014, which claims priority to U.S. Patent Application Ser. No. 61/811,753, titled "Engine Overspeed Protection with Thrust Control" filed Apr. 14, 2013, all of which is incorporated by reference herein.

BACKGROUND

The disclosed embodiments generally pertain to a gas turbine engine. More particularly, but not by way of limitation, present embodiments relate to overspeed protection of gas turbine engines during malfunction conditions.

A typical gas turbine engine generally possesses a forward end and an aft end with its several core or propulsion components positioned axially therebetween. An air inlet or intake is at a forward end of the engine. Moving toward the aft end, in order, the intake is followed by a compressor, a combustion chamber, and a turbine. It will be readily apparent from those skilled in the art that additional components may also be included in the engine, such as, for example, low pressure and high pressure compressors, and high pressure and low pressure turbines. This, however, is not an exhaustive list. An engine also typically has an internal shaft axially disposed along a center longitudinal axis of the engine. The internal shaft is connected to both the turbine and the air compressor, such that the turbine provides a rotational input to the air compressor to drive the compressor blades.

In operation, air is pressurized in a compressor and mixed with fuel in a combustor for generating hot combustion gases which flow downstream through turbine stages. These turbine stages extract gas energy from the combustion gases and converts such to mechanical energy. A high pressure turbine first receives the hot combustion gases from the combustor and includes a stator nozzle assembly directing the combustion gases downstream through a row of high pressure turbine rotor blades extending radially outwardly from a supporting rotor disk. In a two stage turbine, a second stage stator nozzle assembly is positioned downstream of the first stage blades followed in turn by a row of second stage rotor blades extending radially outwardly from a second supporting rotor disk.

In a malfunctioning condition, gas turbine engine fuel systems generally default to one of two conditions. In one condition, the engine fuel supply is shut off and the engine is shutdown with a fuel shutoff system. In a second condition, the engine fuel is supplied in a manner so that the engine is operated at high speed, at or near redline condition with a hydromechanical overspeed governor. Neither of these methods of controlling fuel flow or engine operating conditions is optimal.

As may be seen by the foregoing, it would be desirable to overcome these and other deficiencies with gas turbine engine components so that fuel flow may be controlled and normal engine operation maintained with failures in the normal fuel metering and head regulator systems.

SUMMARY OF THE INVENTION

According to present aspects, engine overspeed protection with thrust control is provided. The system allows fuel flow to be limited and controlled independent of the normal fuel metering and head regulator systems. More specifically, the system provides response to throttle demands during failures in fuel metering, bypass or throttling valves that increase or limit engine fuel flow.

According to some aspects, an engine overspeed protection system comprises a fuel pump in flow communication with a fuel supply and a fuel control system, the fuel pump includes a centrifugal element and a positive displacement element. The positive displacement element is in flow communication with the centrifugal element. The positive displacement element has an inlet and an outlet. A bypass valve circuit may be in flow communication with the inlet and the outlet and, wherein a bypass valve inlet is in flow communication with the positive displacement element outlet and a bypass valve outlet is in flow communication with the positive displacement element inlet.

According to other aspects, an engine overspeed protection system comprises a fuel pump in flow communication with a fuel supply and a fuel control system, the fuel pump including a centrifugal element and a centrifugal boost element, the centrifugal boost element in flow communication with the centrifugal element, the centrifugal boost element having an inlet and an outlet, a bypass valve circuit in flow communication with the inlet and the outlet and, wherein a bypass valve inlet is in flow communication with the positive displacement element outlet and a bypass valve outlet is in flow communication with the centrifugal boost element inlet.

All of the above outlined features are to be understood as exemplary only and many more features and objectives of the invention may be gleaned from the disclosure herein. Therefore, no limiting interpretation of this summary is to be understood without further reading of the entire specification, claims, and drawings included herewith.

BRIEF DESCRIPTION OF THE DRAWINGS

The above-mentioned and other features and advantages of these exemplary embodiments, and the manner of attaining them, will become more apparent and the engine overspeed protection with thrust control feature will be better understood by reference to the following description of embodiments taken in conjunction with the accompanying drawings, wherein.

DETAILED DESCRIPTION

Figure 1:
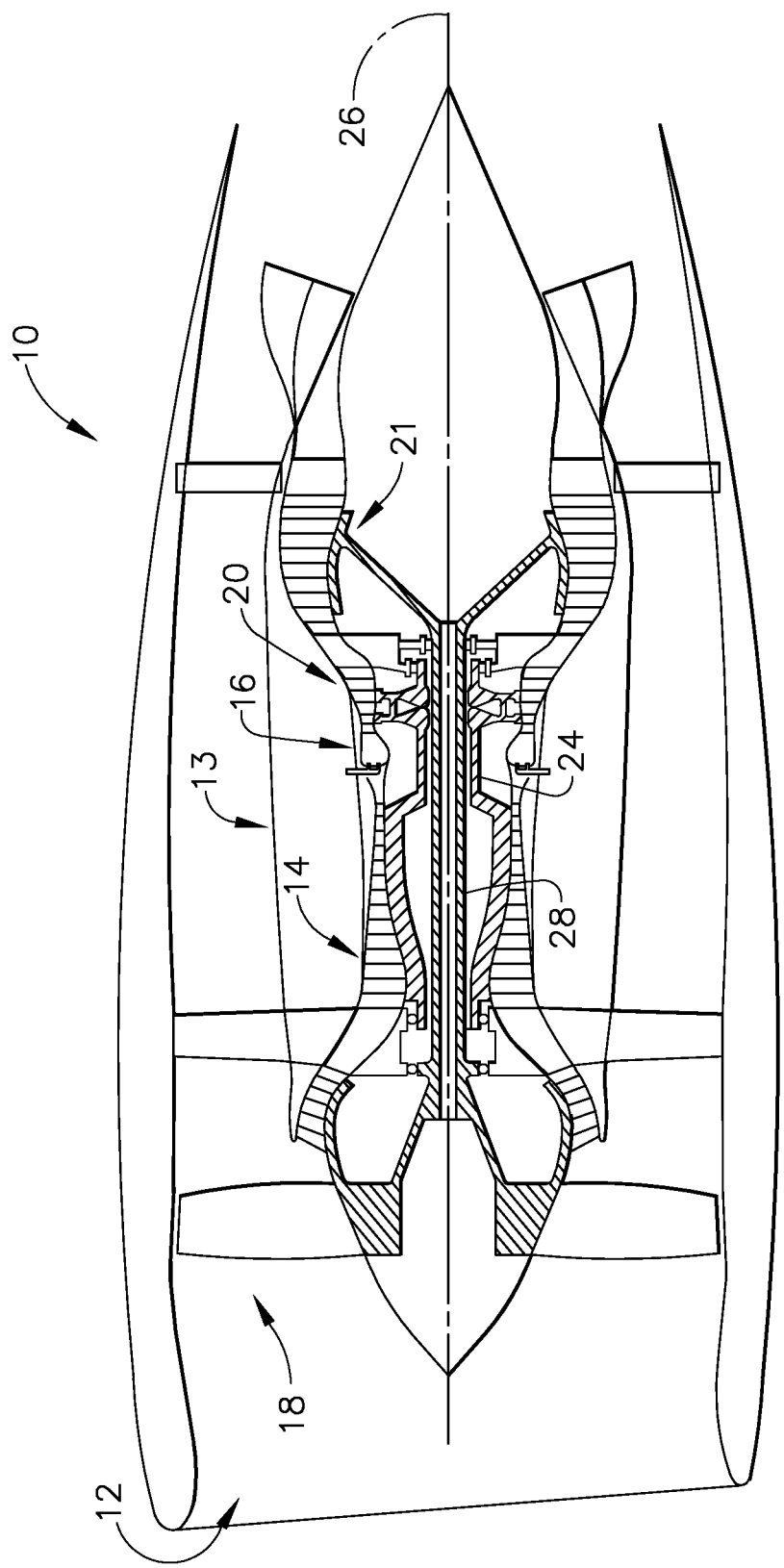
FIG. 1 is a side section view of an exemplary gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Figure 2:
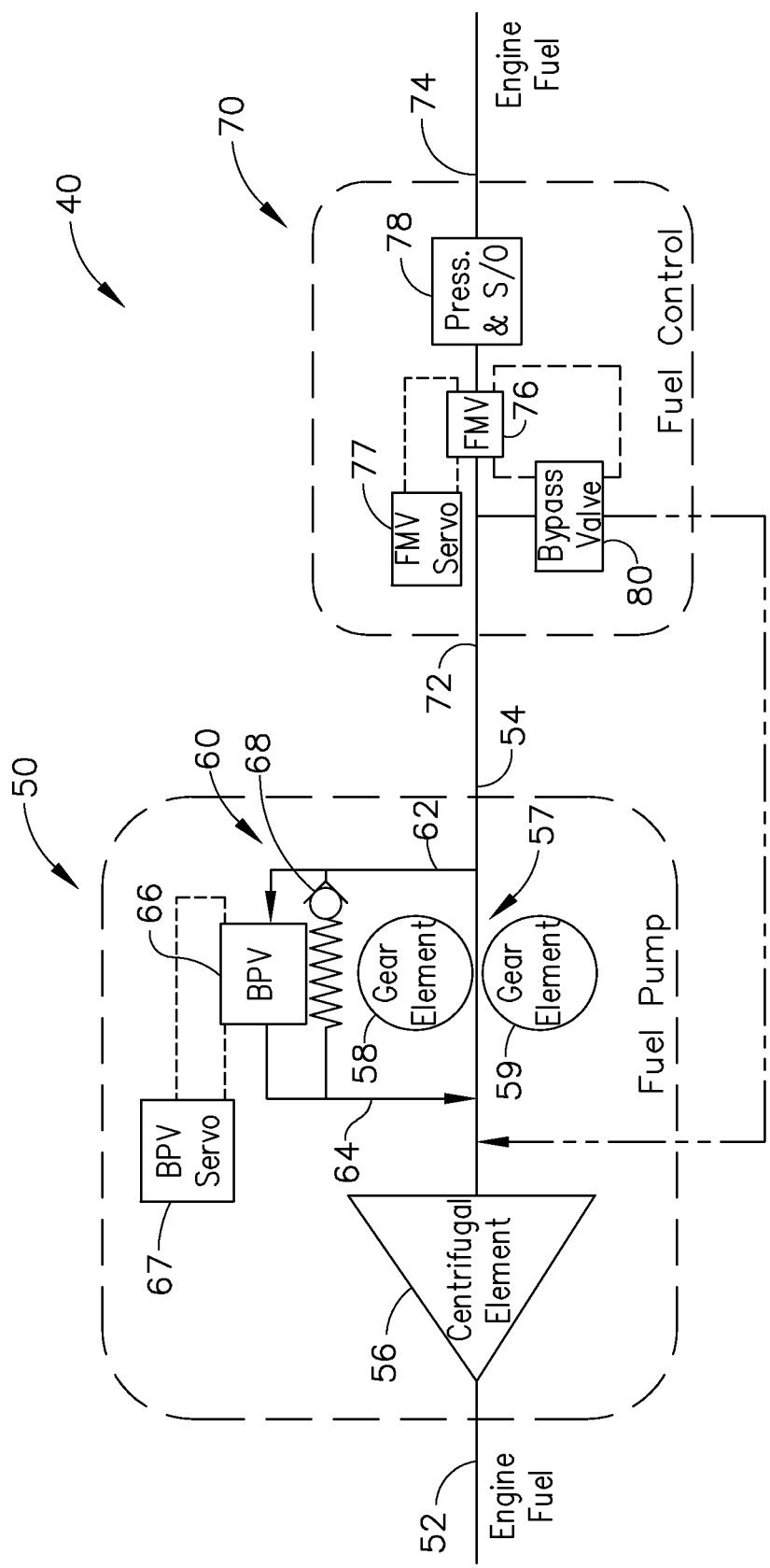
FIG. 2 is schematic view of one embodiment of an engine overspeed protection system with thrust control; and, FIG. 3 is a schematic view of an alternate embodiment of engine overspeed protection system with thrust control of FIG. 2.
Figure 3:
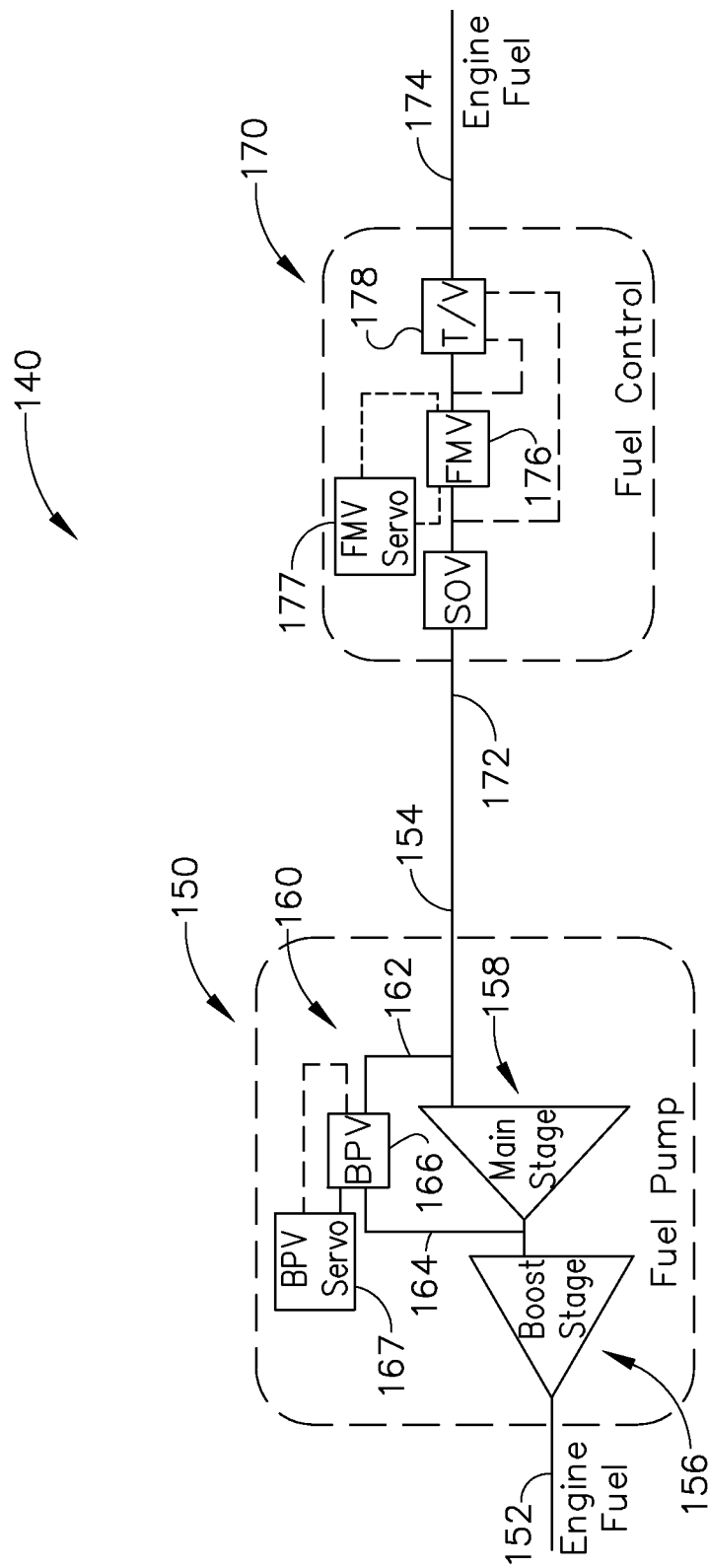

Referring to FIGS. 1-3 various embodiments of a gas turbine engine are taught wherein engine overspeed protection and thrust control are provided in failure conditions. According to one embodiment, a fuel pump system having a servo controlled positive displacement pump bypass is utilized. According to a second embodiment, a servo controlled centrifugal pump bypass is utilized. The proposed embodiments provide a bypass around the fuel pump providing the capability for the fuel flow rate to be adjusted and controlled independent of the fuel metering system.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions. The terms "forward", "aft", "upper", "lower", "below" and the like are with reference to the normal operational attitude of the engine and should not be considered otherwise limiting.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Referring initially to FIG. 1, a schematic side section view of a gas turbine engine 10 is shown having an engine inlet end 12 wherein air enters the propulsor or core 13 which is defined generally by a compressor 14, a combustor 16 and a multi-stage high pressure turbine 20. Collectively, the propulsor 13 provides power during operation. The gas turbine 10 may be used for aviation, power generation, industrial, marine or the like.

In operation, air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn, cause rotation of the shaft 24 about engine axis 26. The shaft 24 passes toward the front of the engine to continue rotation of the one or more compressor stages 14, a turbofan 18 or inlet fan blades, depending on the turbine design. The turbofan 18 is operably connected to a low pressure turbine 21 and creates thrust for the turbine engine 10. The low pressure turbine 21 may also be utilized to extract further energy and power additional low pressure compressor stages or booster and the turbofan 18.

The gas turbine 10 is axisymmetrical about engine axis 26 or shaft 24 so that various engine components rotate thereabout. The axisymmetrical shaft 24 extends through the turbine engine forward end into an aft end and is journaled by bearings along the length of the shaft structure. The shaft 24 rotates about the centerline 26 of the engine 10. The shaft 24 may be hollow to allow rotation of one or more low pressure turbine shafts 28 therein and independent of the shaft 24 rotation. Shaft 28 also may rotate about the centerline axis 26 of the engine and may rotate in the same or different direction than shaft 24. During operation, the shaft 28 rotates along with other structures connected to the shaft such as the rotor assemblies of the turbine in order to create power or thrust for various types of turbines used in power and industrial or aviation areas of use.

Referring now to FIG. 2, a schematic view of a first embodiment of an engine overspeed protection system 40 with thrust control is shown. FIG. 2 represents a simplified schematic view. For clarity, filters, heat exchangers, actuators, valves, and other components, which may be incorporated in various locations, have been omitted. The engine overspeed protection system 40 includes a controlled fuel bypass path or circuit 60 about a main fuel pump which limits, in controlled fashion, fuel flow proceeding to the engine independent of the fuel metering or control system 70. The engine overspeed protection system 40 comprises a fuel pump system 50 and a fuel control system 70. The fuel pump system 50 pumps fuel to the fuel control system 70 which meters fuel flow to the combustor 16 (FIG. 1) for burning.

The fuel pump system 50 includes a fuel supply 52 and a fuel output 54. In the depicted schematic view, the fuel moves from the left to the right. However, this should not be construed as limiting. Within the interior of the fuel pump system 50 is a boost stage, depicted as a centrifugal element 56. An input of the centrifugal element 56 is in fluid communication with the fuel supply 52. At an output of the centrifugal element 56 is a positive displacement stage 57, for example having gear elements 58, 59. The positive displacement stage 57 may consist of gear elements, vane elements, or piston elements. The gear elements 58, 59 function to direct fuel from the fuel pump system 50 to the fuel control system 70.

The fuel pump system 50 also comprises the bypass circuit 60. A bypass circuit inlet 62 is disposed downstream of the gear elements 58, 59. The bypass circuit outlet 64 extends back to the upstream side of the gear elements 58, 59. The bypass circuit 60 includes a bypass valve 66 which is positioned by the engine control through the bypass servo 67, and remains closed during normal operation. In the engine fuel control system 70, if the fuel metering valve 76 fails open, or the bypass valve 80 fails close, more fuel flow will be delivered to the engine than commanded by the engine control. In this situation, the bypass valve 66 is positioned by the bypass valve servo 67 to adjust the amount of fuel flow delivered at the fuel pump output 54, through the bypass circuit 60 while still providing enough fuel to maintain engine operation and respond to throttle demands. Under failure conditions, the bypass circuit, 60 becomes the engine fuel metering system. This is accomplished by the flow taking the path of least resistance. The bypass circuit 60 may also include an overpressure relief valve 68. The overpressure relief valve 68 may be independent of the circuit 60 or may be combined with the circuit 60. The overpressure relief valve 68 serves to limit pump discharge pressure in case of partial or complete blockage of fuel flow in the engine fuel system.

Referring now to the fuel control system 70, fuel is received at the fuel control system 70 from the fuel pump system 50. The fuel control system 70 comprises an input 72 and an output 74. The fuel control system 70 further comprises a fuel metering valve 76 in flow communication with the input 72. On the downstream end of the fuel metering valve 76 is a pressurization and shutoff valve 78. A bypass valve 80 is utilized to maintain a desired pressure drop across the fuel metering valve 76. The fuel metering valve 76 may be adjusted by a servo or other such control 77.

Within the fuel control system 70, a bypass valve 80 is also in fluid communication with the fuel metering valve 76, upstream of the bypass valve 80. The bypass valve 80 maintains a relatively constant pressure drop across the metering valve 76 during engine operation. If the pressure drop across the metering valve 76 exceeds a preselected value, the bypass valve 80 opens to allow flow back to the fuel pump system 50. If the pressure drop across the fuel metering valve 76 is below a preselected value, the bypass valve 80 closes, which increases fuel flow to the engine and pressure drop across the metering valve 76.

When a failure in the fuel control system 70 occurs, for example the metering valve 76 fails open or the bypass valve 80 fails close, the fuel travels from the discharge at the gear elements or gear stages 58, 59 through the bypass circuit 60. This results in regulation of the fuel flow rate to the engine. More specifically, fuel flow rate to the engine is limited and controlled independently of the engine fuel control system 70. This allows continued engine operation and response to throttle demands.

Referring now to FIG. 3, a schematic view of an alternative embodiment of the engine overspeed protection system 140 is depicted. FIG. 3 represents a simplified schematic view. For clarity, filters, heat exchangers, actuators, valves, and other components, which may be incorporated in various locations, have been omitted. According to the instant embodiment, a fuel pump system 150 may comprise a centrifugal pump with servo 167 controlled bypass valve 166, as opposed to the positive displacement pump of the embodiment of FIG. 2.

The fuel pump system 150 includes a fuel supply or inlet 152 and a fuel outlet 154. As with the previous embodiments, the fuel moves left to right across the depicted exemplary view, and as with the previous embodiment, this is merely descriptive and non-limiting in nature. The fuel inlet 152 is in fluid communication with a first or boost stage 156, depicted as a centrifugal element. The boost stage 156 is in fluid communication with a main stage 158.

A bypass valve circuit 160 is shown within the fuel pump system 150 and in fluid communication at the output side of the main stage 158. The input side 162 of the bypass circuit 160 is located downstream of the main stage 158. The input 162 is in fluid communication with the output side 164 connected to a forward or upstream end of the main stage 158. Disposed between the input side 162 and the output side 164 is a bypass valve 166. This allows bypass of some fuel about the main stage 158 with an amount of fuel necessary for operation of the engine still passing to a fuel control system 170. If failure in the fuel control 170 occurs, the bypass servo 167 allows control of fuel at the pump system 150.

The fuel control system 170 is in fluid communication with the fuel pump system 150. The fuel control system 170 includes an input 172 and an output 174. The fuel control system 170 includes a fuel metering valve 176 and a throttling valve 178. The fuel metering valve 176 may be controlled by a metering valve servo 177. The throttling valve 178 is shown downstream of the metering valve 176. It may alternatively be located upstream of the flow metering valve 176. The throttling valve 178 maintains a relatively constant pressure drop across the metering valve 176 during engine operation. If the pressure drop across the metering valve 176 exceeds a preselected value, the throttling valve 178 closes to restrict flow and reduce pressure. If the pressure drop across the fuel metering valve 176 is below a preselected value, throttling valve 178 opens which increases fuel flow to the engine and pressure drop across the metering valve 176.

When a failure in the fuel control system 170 occurs, for example the metering valve 176 fails open or the throttling valve 178 fails open, the fuel travels from the discharge of the main stage 158 through the bypass circuit 160. This results in regulation of the fuel flow rate to the engine. More specifically, fuel flow rate to the engine is limited and controlled independently of the engine fuel control system 170 by way of the bypass servo 167 adjusting position of the bypass valve 166.

The present embodiments which allow continued engine operation and response to throttle demands during engine malfunction or failure rather than shutting down the engine or maintaining the engine at redline speed. Additionally, risks associated with multiple engine events are significantly reduced.

The foregoing description of structures and methods has been presented for purposes of illustration. It is not intended to be exhaustive or to limit the structures and methods to the precise forms and/or steps disclosed, and obviously many modifications and variations are possible in light of the above teaching. Features described herein may be combined in any combination. Steps of a method described herein may be performed in any sequence that is physically possible. It is understood that while certain forms of structures have been illustrated and described, it is not limited thereto and instead will only be limited by the claims, appended hereto.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used.

Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An engine overspeed protection system, comprising:
a fuel pump in flow communication with a fuel supply and a fuel control system, wherein the fuel control system comprises a fuel metering valve, and further wherein the fuel control system comprises a first bypass valve in flow communication with said fuel metering valve;
said fuel pump including a centrifugal element and a positive displacement element, said positive displacement element in flow communication with said centrifugal element;
said positive displacement element having a first portion and a second portion, said positive displacement element having an inlet and an outlet;
wherein the fuel pump comprises a second bypass valve in flow communication at a bypass valve circuit, wherein the bypass valve circuit is in flow communication with said inlet and said outlet, and wherein the bypass valve circuit and the second bypass valve are operably independent of the fuel control system relative at least to a rate of fuel flow,
wherein a bypass valve inlet of the second bypass valve is in flow communication with said positive displacement element outlet and a bypass valve outlet of the second bypass valve is in flow communication with said positive displacement element inlet;
an overpressure relief valve at the bypass valve circuit, wherein the overpressure relief valve limits fuel pump discharge pressure,
a bypass valve servo communicatively coupled to the second bypass valve; and
an engine control configured to decrease the rate of fuel flow delivered at the positive displacement element outlet independently of the fuel control system, by opening the second bypass valve via the bypass valve servo and permitting fuel flow to enter the bypass valve circuit, when the fuel metering valve fails opens or the first bypass valve fails closed; and
wherein the engine control is further configured to keep the second bypass valve closed during normal operation of the fuel metering valve and the first bypass valve.

2. The engine overspeed protection system of claim 1, wherein said first bypass valve is in flow communication upstream of said fuel metering valve.

3. The engine overspeed protection system of claim 2, wherein said first bypass valve of said fuel control system is in fluid communication with an input of said fuel metering valve.

4. The engine overspeed protection system of claim 3 wherein when pressure drop across said fuel metering valve is above a preselected value, said first bypass valve of said fuel control system opens to return fuel to said fuel pump.

5. The engine overspeed protection system of claim 4 wherein when pressure drop across said fuel metering valve is below said preselected value, said first bypass valve of said fuel control system closes.

6. The engine overspeed protection system of claim 2, wherein said first bypass valve of said fuel control system is in return flow communication with said fuel pump.

7. The engine overspeed protection system of claim 1, said engine overspeed protection system provides enough fuel to keep an engine running and responsive to throttle control, when the fuel metering valve fails open or the first bypass valve fails closed.

8. The engine overspeed protection system of claim 1, said engine overspeed protection system providing engine operation and response to throttle demands.

9. An engine overspeed protection system, comprising:
a fuel pump in flow communication with a fuel supply and a fuel control system, wherein the fuel control system comprises a fuel metering valve, and further wherein the fuel control system comprises a first bypass valve in flow communication with said fuel metering valve;
said fuel pump including a centrifugal boost stage element and a centrifugal main stage element, said centrifugal boost element in flow communication with said centrifugal main stage element;
said centrifugal main stage element having an inlet and an outlet;

wherein the fuel pump comprises a second bypass valve in flow communication at a bypass valve circuit, wherein the bypass valve circuit is in flow communication with said inlet and said outlet, wherein the bypass valve circuit and the second bypass valve are operably independent of the fuel control system relative at least to providing a rate of fuel flow, and wherein a bypass valve inlet of the second bypass valve is in flow communication with said centrifugal main stage element outlet and a bypass valve outlet of the second bypass valve is in flow communication with said centrifugal main stage element inlet; and an overpressure relief valve at the bypass valve circuit, wherein the overpressure relief valve limits fuel pump discharge pressure;

a bypass valve servo communicatively coupled to the second bypass valve; and an engine control configured to decrease the rate of fuel flow delivered at the centrifugal main stage element outlet independently of the fuel control system, by opening the second bypass valve and permitting fuel flow to enter the bypass valve circuit, when the fuel metering valve fails opens or the first bypass valve fails closed; and wherein the engine control is further configured to keep the second bypass valve closed during normal operation of the fuel metering valve and the first bypass valve.

10. The engine overspeed protection system of claim 9, wherein the second bypass valve is disposed in said bypass valve circuit.

11. The engine overspeed protection system of claim 9, said engine control configured to actuate said second bypass valve by the bypass valve servo, wherein the bypass valve servo and the second bypass valve are configured to decrease the rate of fuel flow at the centrifugal main stage element outlet independently of the fuel control system when the fuel metering valve fails open or the first bypass valve fails closed.

12. The engine overspeed protection system of claim 11, said second bypass valve controlling fuel flow when said fuel control system fails in an open position.

13. The engine overspeed protection system of claim 12, said bypass servo being actuable to control fuel flow to an engine.

14. The engine overspeed protection system of claim 9, said fuel control having a throttling valve.

15. The engine overspeed protection system of claim 14, said throttling valve maintaining a constant pressure drop across the fuel metering valve.

16. The engine overspeed protection system of claim 15, said throttling valve either opening or closing to vary the pressure drop across said fuel metering valve and flow of fuel to an engine.

\* \* \* \* \*